United States Patent [19]

Scheuneman

[11] Patent Number: 4,722,052
[45] Date of Patent: Jan. 26, 1988

[54] MULTIPLE UNIT ADAPTER

[75] Inventor: James H. Scheuneman, St. Paul, Minn.

[73] Assignee: Sperry Corporation, New York, N.Y.

[21] Appl. No.: 47,579

[22] Filed: May 5, 1987

Related U.S. Application Data

[63] Continuation of Ser. No. 596,205, Apr. 2, 1984, abandoned.

[51] Int. Cl.⁴ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,413,613 | 11/1968 | Bahrs et al. | 364/200 |
| 4,016,545 | 4/1977 | Lipouski | 364/200 |
| 4,034,347 | 7/1977 | Probert, Jr. | 364/200 |
| 4,062,059 | 12/1977 | Suzuki et al. | 364/200 |
| 4,101,960 | 7/1978 | Stokes et al. | 364/200 |
| 4,115,851 | 9/1978 | Nagano et al. | 364/200 |
| 4,151,598 | 4/1979 | Webster | 364/900 |
| 4,228,500 | 10/1980 | Webster | 364/200 |
| 4,268,903 | 5/1981 | Miki et al. | 364/200 |
| 4,288,860 | 9/1981 | Trost | 364/900 |
| 4,399,507 | 8/1983 | Cosgrove et al. | 364/200 |

Primary Examiner—Gary V. Harkcom
Assistant Examiner—Randy W. Lacasse
Attorney, Agent, or Firm—Charles A. Johnson; Lawrence J. Marhoefer

[57] ABSTRACT

A Multiple Unit Adapter is disclosed which provides a high speed interface between a single Scientific Processor and a plurality of High Performance Storage Units. This Multiple Unit Adapter is required only when more than one High Performance Storage Unit is used in the data processing system. Since the Scientific Processor of the data processing system is configured with only a single High Performance Storage Unit port its design is simplified and, of course, its cost is reduced. This is especially so when the data processing system uses only a single High Performance Storage Unit. It therefore enables the data processing system to be expanded into a system having a larger memory capacity while keeping the design of the Scientific Processor constant, less complex and consequently less costly.

8 Claims, 26 Drawing Figures

SP TO MUA AND MUA TO HPSU
INTERFACE SIGNALS

| SIGNAL | NUMBER OF LINES |
|---|---|
| REQUEST | 1 |
| REQUEST TAG | 1 |
| ADDRESS | 22 |
| ADDRESS PARITY | 3 |
| WRITE DATA | 144 |
| WRITE DATA PARITY | 16 |
| FUNCTION CODE | 6 |
| FUNCTION CODE PARITY | 1 |

FIG. 5

HPSU TO MUA AND MUA TO SP
INTERFACE SIGNALS

| SIGNAL | NUMBER OF LINES |
|---|---|
| REQUEST TAG RESPONSE | 1 |
| ACKNOWLEDGE 1 | 1 |
| ACKNOWLEDGE 2 | 1 |
| MAINTENANCE ACKNOWLEDGE 2 | 1 |
| READ ACKNOWLEDGE 2 TAG | 1 |
| INTERFACE CHECK | 1 |
| INTERNAL CHECK | 1 |
| READ DATA | 144 |
| READ DATA PARITY | 16 |
| BANK NOT AVAILABLE | 1 |
| INITIAL LOAD PATH 0,1 | 2 |
| MULTIPLE UNCORRECTABLE ERROR | 4 |

FIG. 10

SIGNALS BETWEEN THE SP AND MUA
(SP/MUA INTERFACE)

| SIGNAL | NO. OF LINES | DIRECTION SP — MUA |
|---|---|---|
| SP AVAILABLE | 2 | → |
| MUA AVAILABLE | 2 | ← |
| ACKNOWLEDGE 0 | 1 | ← |
| MUA IF CHECK 1 | 1 | ← |
| MUA IF CHECK 2 | 1 | ← |
| MUA INTERNAL CHECK | 1 | ← |
| MASTER CLEAR | 1 | → |
| EXTERNAL SEQUENCE ERROR | 1 | ← |
| STORAGE UNIT NOT AVAILABLE | 1 | ← |
| MUA PRESENT | 1 | ← |

FIG. 12

SIGNALS BETWEEN THE MUA AND HPSU (MUA/HPSU INTERFACE)

| SIGNAL | NO. OF LINES | DIRECTION |
|---|---|---|
| MUA AVAILABLE | 2 | MUA → HPSU |
| HPSU AVAILABLE | 2 | MUA ← HPSU |

FIG. 13

HPSU SELECTION FORMAT

| 0 | 1 | 2 | 21 |
|---|---|---|---|
| HPSU SELECT 2 BITS | | 20 BITS | |

FIG. 6

SP ADDRESS FORMAT (25 BITS)

| 0-2, 19-21 | P | 3-10 | P | 11-18 | P |
|---|---|---|---|---|---|

FIG. 7

SP FUNCTION FORMAT (7 BITS)

| 0-5 | P |
|---|---|

FIG. 8

WRITE DATA FORMAT

| SP WORD 0 | | | | | | | | SP WORD 1 | SP WORD 2 | SP WORD 3 |
|---|---|---|---|---|---|---|---|---|---|---|
| 0-8 | P | 9-17 | P | 18-26 | P | 27-35 | P | 36-71 | 72-107 | 108-143 |

FIG. 9

READ DATA FORMAT

| SP WORD 0 | | | | | | | | SP WORD 1 | SP WORD 2 | SP WORD 3 |
|---|---|---|---|---|---|---|---|---|---|---|
| 0-8 | P | 9-17 | P | 18-26 | P | 27-35 | P | 36-71 | 72-107 | 108-143 |

FIG. 11

MULTIPLE UNIT ADAPTER

This is a continuation of co-pending application Ser. No. 596,205 filed on Apr. 2, 1984, now abandoned.

RELATED PATENT APPLICATIONS

The following co-pending patent applications are assigned to the assignee of this invention, and their teachings are incorporated herein reference:
Title: HIGH PERFORMANCE STORAGE UNIT
Inventor: James H. Scheuneman
Ser. No.: 596,130
Filed: 4-2-84
Title: PARTIAL DUPLEX OF PIPELINED STACK WITH DATA INTEGRITY CHECKING
Inventor: James H. Scheuneman
Ser. No.: 595,864
Filed: Apr. 2, 1984

CONTENTS

Related Patent Applications
Contents
Background of the Invention
  A. Field of the Invention
  B. State of the Prior Art
Objects
Summary of the Invention
Brief Description of the Drawings
Description of the Preferred Embodiment
  A. Conventions
  B. The System
  C. High Performance Storage Unit
  D. Multiple Unit Adapter
  E. Scientific Processor
  F. Interface Signals of the Multiple Unit Adapter
  G. Building Blocks of the Multiple Unit Adapter
  H. Detailed Logic Diagrams of the Multiple Unit Adapter
Claims

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved High Performance Storage Unit for use in such a digital data processing system. Still more particularly this invention relates to an improved Multiple Unit Adapter for use with more than one of such High Performance Storage Units, when it is desired to interface a single scientific processor with multiple High Performance Storage Units.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Michigan. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfers involve the use of the input/output path of the front-end processor, it is this input/output path and the transfer of data thereon between the primary and secondary storage systems which becomes the limiting ink between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is everincreasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

When more than one high speed storage unit is desired, a multiple unit adapter (MUA) is utilized between each scientific processor and multiple high speed storage units. Generally, the MUA is an interface unit which couples a single scientific processor through the use of a single scientific processor port to a plurality of up to four high speed stroage units (HPSU) via four HPSU ports. In this manner one or more scientific processors may address, read and write any location in any of the HPSU's.

In systems that utilize a multiplicity of processors to access, a common memory system, either for reading or writing, it has been found necessary to establish an access priority sequence between processors seeking access to the memory system. Memory systems that can accommodate multiple requesters, such as multiple processing units, are designated multiple port or multiple channel memory systems. In such systems, it is necessary to identify the processor seeking access to the memory system, and to enable the appropriate port or channel associated with the identified requestor. With multiple requestors, it is common to have requests queued up and to have memory addressing and data to be written available from the queued sources.

The present invention is directed to the Multiple Adapter Unit (MUA) used in this scientific data processing system and thus will describe in detail the previously noted adapter which permits the scientific processor to address more than one high speed storage units.

OBJECTS

It is a primary of object of this invention to previde an improved digital data processing system wherein one or more host data processors utilize one or more supporting scientific processors in conjunction with storage systems that are commonly accessible.

Another primary object of the invention is to provide an improved High Performance Storage Unit for use in a data processing system.

It is still another object of the present invention to provide an improved adapter unit for use in a Scientific data processing system.

It is also an object of the present invention to provide an improved adapter unit which permits the Scientific Processor of the data processing system to address more than one storage unit.

It is a still further object of the present invention to provide an improved Multiple Unit Adapter which comprises at least one interface port for use in connecting to a single scientific processor of a data processing system and includes more than one interface port for interconnection to more than one high speed storage units.

It is also an object of the present invention to provide a Multiple Unit Adapter capable of interfacing a Scientific Processor and two to four High Performance Storage Units which adapter is capable of checking interface parity as well as providing internal duplex checking of control signals.

It is also an object of the present invention to provide a quad word interface between the Scientific Processor and two to four High Performance Storage Units.

It is also an object of the present invention to provide a Multiple Unit Adapter capable of interconnecting a single scientific processor with two to four high performance storage units, which Multiple Unit Adapter has a storage stack for Scientific Processor Requests, which requests are taken off the stack in sequential order, that is, in a first in, first out (FIFO) order.

It is a still further object of the present invention to disclose an adapter which provides an eight deep stack for the address, write data and function information associated with the Scientific Processor reouests.

It is also an object of the present invention to provide a Multiple Unit Adapter for use in a scientific data processing system wherein the Multiple Unit Adapter transmits a Scientific Processor request to the High Performance Storage Unit, an acknowledge signal to the Scientific Processor, which informs the Scientific Processor that it can issue another request to the Multiple Unit Adapter.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processor (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSUs via four HPSU ports. In this manner a Scientific Processors may address, read and write any location in any of the HPSUs.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor. The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide overall increased performance for scientific vector FORTRAN programs.

In conclusion a Multiple Unit Adapter is disclosed which is used in such a scientific data processing system to interface at least one scientific processor to a plurality of high performance storage units. The use of a separate adapter in such a data processing system enables the scientific processor of such a system to have a single high performance storage port to thereby reduce the cost of the scientific processor when a single storage unit is desired to be used in the system. This adapter is required only when more than one high performance storage unit is used in the scientific data processing system thereby providing the additional memory interfaces needed for the scientific processor.

The foregoing objective and other more detailed and specific objects will become apparent and be understood from the drawings and the description of the invention.

BRIEF DESCRIPTION OF THE DRAWINGS

FIG. 5 is a table showing the interface signals from the SP to the MUA and the MUA to each HPSU;

FIG. 6 illustrates the High Performance Storage Unit (HPSU) selection format;

FIG. 7 shows the Scientific Processor (SP) address format;

FIG. 8 pictures the SP function format;

FIG. 9 presents the SP write data format;

FIG. 10 is a table showing the interface signals from each HPSU to the MUA and from the MUA to the SP;

FIG. 11 shows the SP read data format;

FIG. 12 is also a table showing further interface signals between the SP and the MUA;

FIG. 13 is a table showing further interface signals between the MUA and the HPSU;

DETAILED DESCRIPTION OF THE PREFERRED EMBODIMENT

A. Conventions

Figure 1:
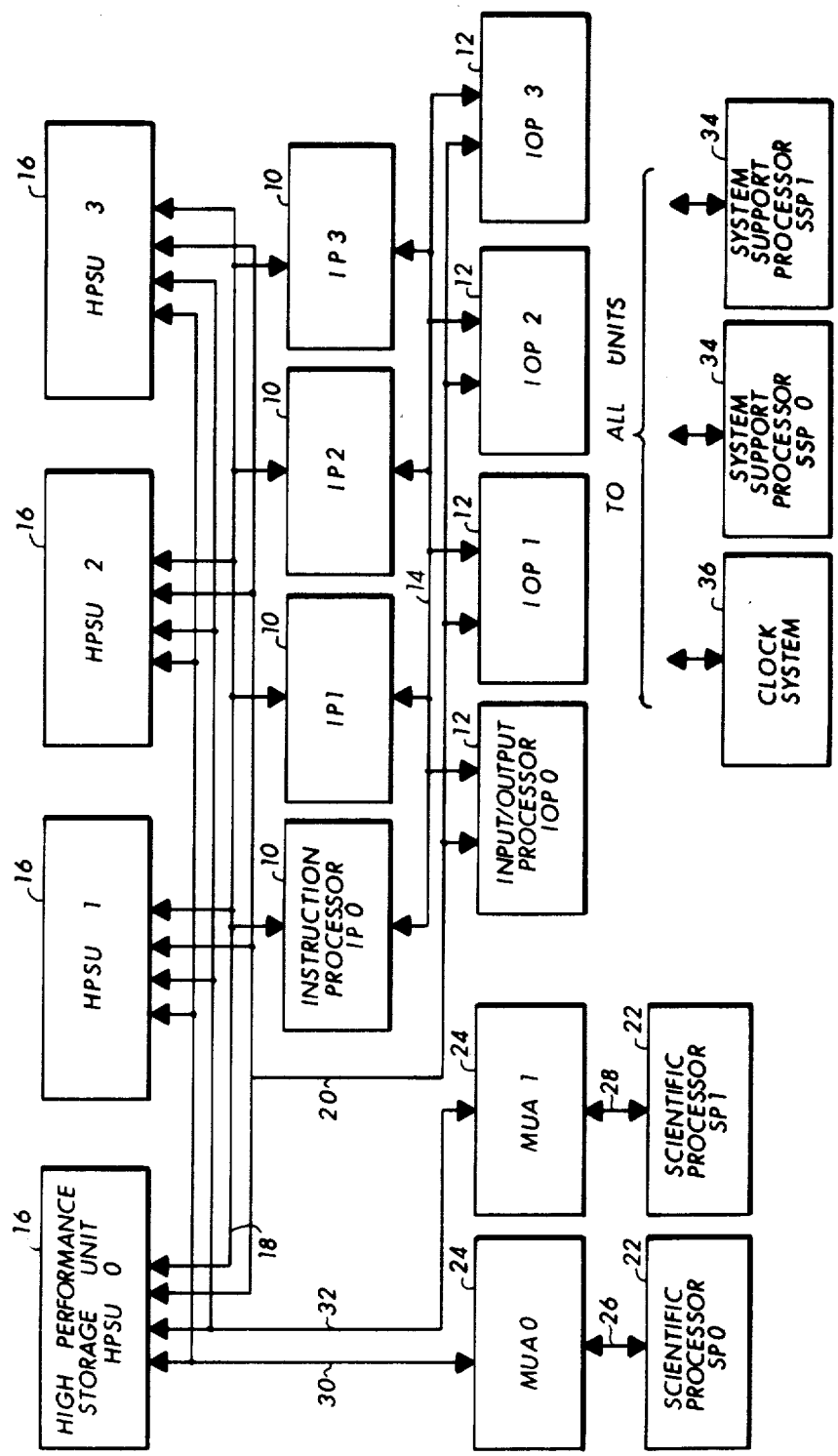
FIG. 1 is a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connecntions between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as Input/Output Processors to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified copending incorporated patent applications.

In the embodiment illustrated one or two Scientific Processors SP0 and SP1, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each Ip as will as each HPSU, each IOP, and each SP. The clock interface includes signals and commands from the IP for controlling clock rates, clock mode, cycle count, and other capabilities of the clock. The clock system is novel, and is described in one of the above identified copending patent applications.

Intercommunication between units is essentially on a Request and Acknowledge basis, and the interfaces will be described in more detail as appropriate.

C. High Performance Storage Unit (HPSU)

Figure 2:
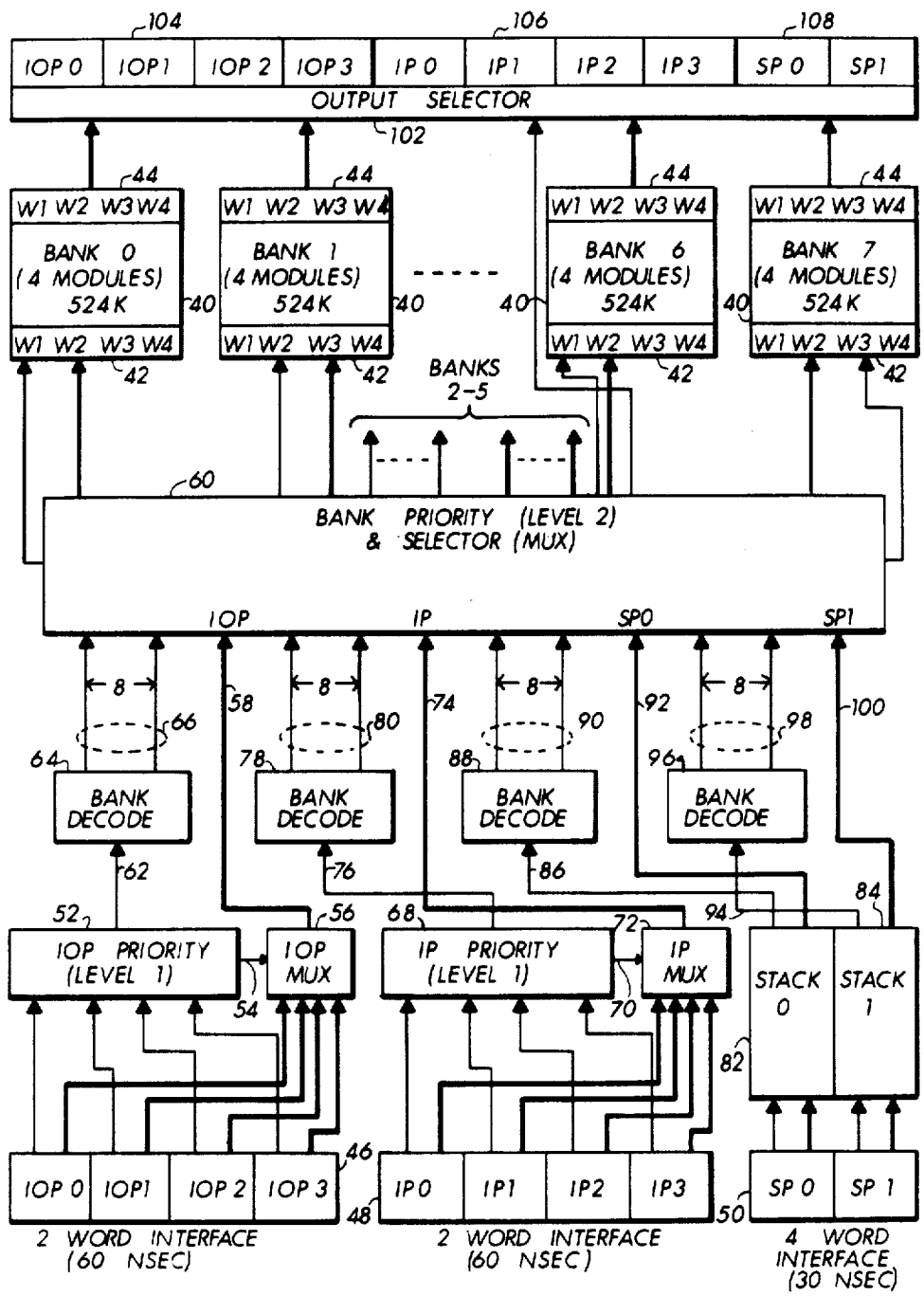
FIG. 2 is a simplified functional block diagram of the High Performance Storage Unit.

FIG. 2 is a simplified functional blocked diagram of the High Performance Storage Unit.

The HPSU is a storage device that is commonly accessable by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the signle lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IP0 through IP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 aWaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection on lines 90 and data passes on line 92 to the Bank Priority Seclector 60. Similarly, request information passes on line 94 to the Bank Decode 96 for making selctions on lines 98, while the data passes on line 100.

The Bank Priority and Selector functions to select between the IOP, IP, and the two SP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP1 through IP3. Finally, it has an SP output 108 capable of handling two SP output ports labelled SP0 and SP1. Data rates and timing at the output ports 104, 106 and 108 are similar to those for the input ports previously described.

D. Multiple Adapter (MUA)

Figure 3:
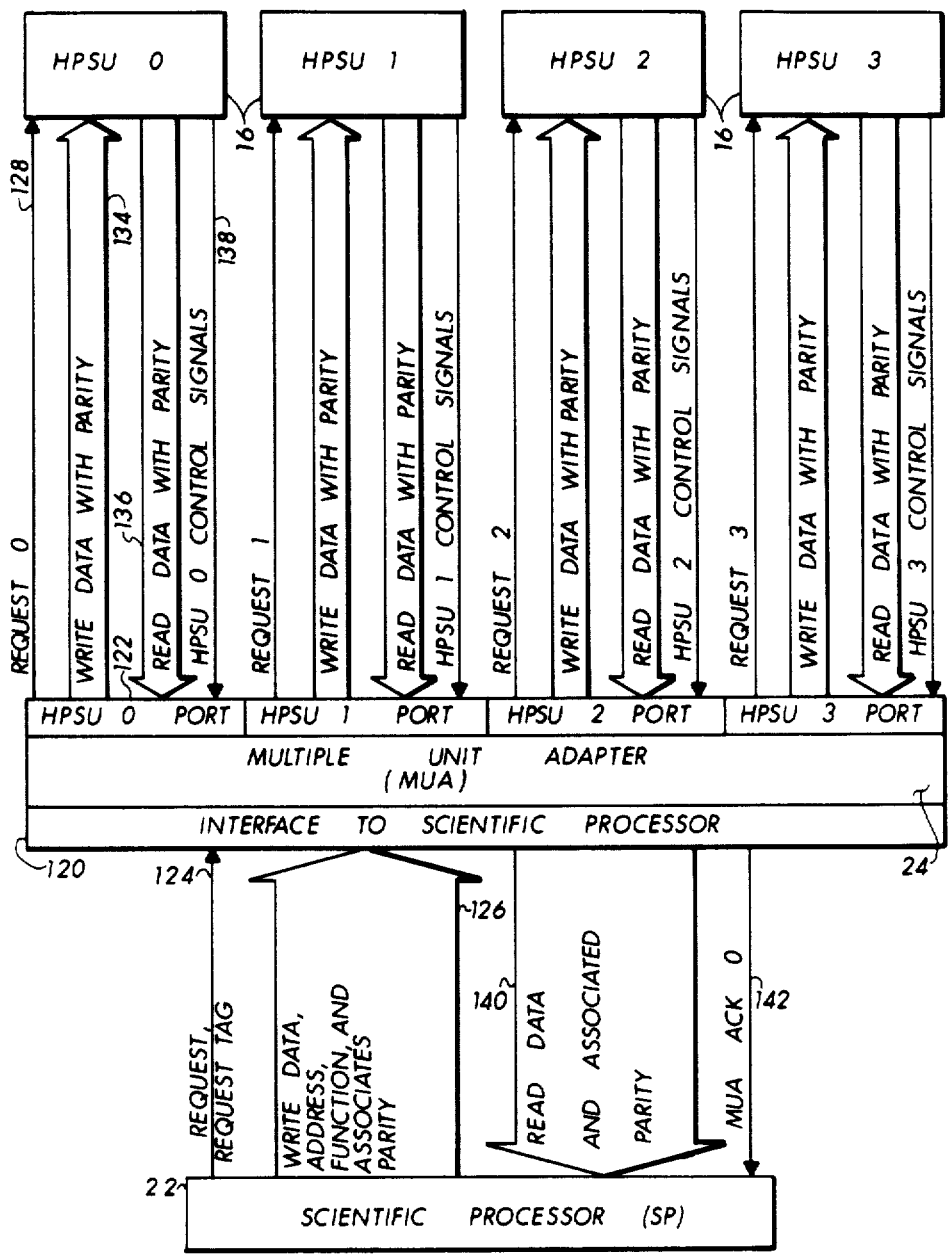
FIG. 3 is a simplified block diagram of the Multiple Unit Adapter (MUA) for providing selective interconnection of a Scientific Processor to one of up to four High Performance Storage Units.

FIG. 3 is a simplified blocked diagram of the Multiple Unit Adapter (MUA) for providing selective interconnection of a Scientific Processor to one of up to four High Performance Storage Units. It is to this adapter that the present application is directed.

The MUA 24 has an Interface to Scientific Processor 120 and up to four HPSU ports 122, each adapted for interconnection to an associated HPSU 16.

A Scientific Processor (SP) 22 issues Request signals on control path 124 to the MUA. For a write operation, the write data, address, function, and associated parity is provided via cable 126. The MUA can accumulate up to eight request from the SP without acknowledgement, and the requests and the associated data are stored in a first-in-first-out (FIFO) stack (not shown in this figure).

For purposes of example, if it is assumed that the SP has designated HPSU0, and the request is determined by the MUA to be the next request to be processed, a Request 0 will be provided on control path 128 to HPSU0. Recalling that this will be only one of several reques that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) nal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, and all data and control signals from the HPSU are passed on to the SP with the exception of a few special control signals. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
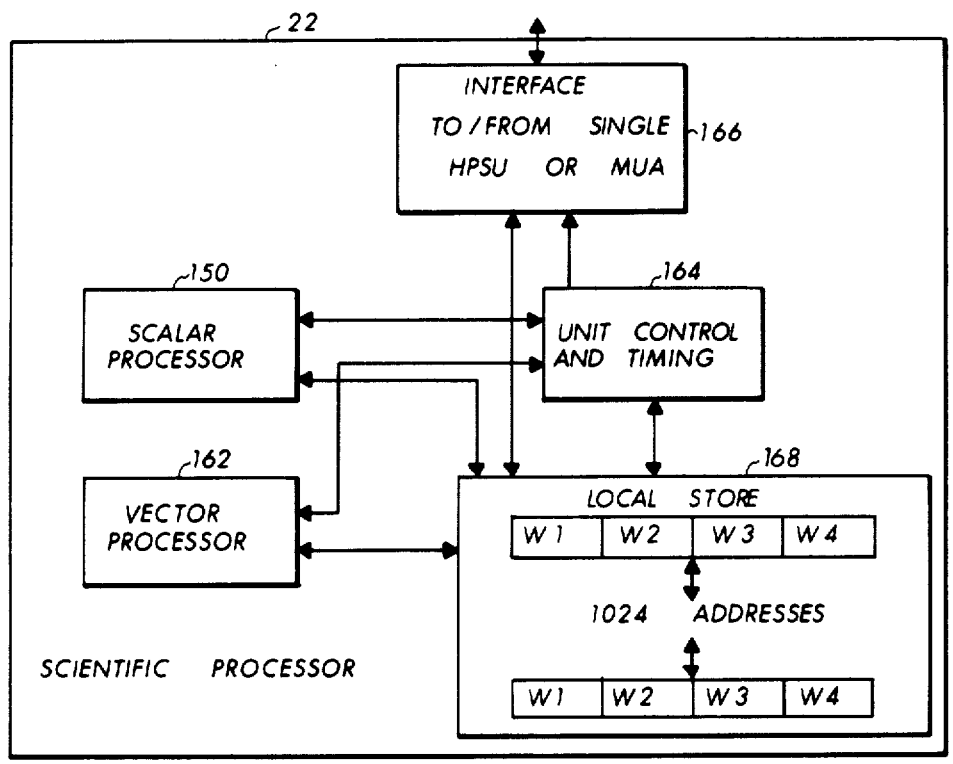
FIG. 4 is a simplified block diagram of the Scientific Processor.

FIG. 4 is a simplified block diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priveledged modes of operation. The SP includes distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the over-all control function, including instruction fetch and issue. Generally speaking, the Scalar and Vector processor modules may operate on different instructions in parallel although some Scientific Processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted is distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The following listing identifies the named signals according to the number of conductors relative to each type of requestor unit. It will be understood that other signal lines may be used for other types of control functions, but are not defined or discussed since they do not add to an understanding of the subject invention.

| HPSU/REQUESTER INTERFACE SIGNALS | | | | |
|---|---|---|---|---|
| | NUMBER OF LINES | | | DIRECTION |
| SIGNAL | IOP | IP | SP | REQUESTER |
| REQUESTER AVAILABLE | 2 | 2 | 2 | To HPSU |
| HPSU AVAILABLE | 2 | 2 | 2 | From HPSU |
| REQUEST | 1 | 1 | 1 | To HPSU |
| ACKNOWLEDGE 1 | 1 | 1 | 1 | From HPSU |
| ADDRESS | 24 | 24 | 22 | To HPSU |
| ADDRESS PARITY | 4 | 4 | 3 | To HPSU |
| WRITE DATA | 72 | 72 | 144 | To HPSU |
| WRITE DATA PARITY | 8 | 8 | 16 | To HPSU |
| READ DATA | 72 | 72 | 144 | From HPSU |
| READ DATA PARITY | 8 | 8 | 16 | From HPSU |
| FUNCTION CODE | 5 | 5 | 6 | To HPSU |
| FUNCTION CODE PARITY | 1 | 1 | 1 | To HPSU |
| START | 6 | 6 | 0 | To HPSU |
| START PARITY | 1 | 1 | 0 | To HPSU |
| END | 6 | 6 | 0 | To HPSU |
| END PARITY | 1 | 1 | 0 | To HPSU |

In the following discussion of the drawings certain abbreviations will be utilized. In this regard, Request is REQ, Address is ADRS, Function is FUNC, Multiplexer is MUX, Enable is EN, Register is REG, Error is ERR, Execlusive-OR is XOR, and an AND function is A.

Before describing any detail an over-all operational description should be helpful.

Because of the high performance requirement of the system, the MUA can accumulate up to eight requests from an SP without an acknowledgement. These requests are stored in an eight deep stack register. Requests are serviced in sequential order, i.e. first-in-first-out (FIFO).

As each request is passed onto a HPSU, an Acknowledge signal (ACKO) is sent back to the SP indicating that the stack has room for one more request. When the MUA has passed eight requests to the same HPSU without an acknowledgement, the MUA ceases requesting until an ACK 1 signal is received. The ACK 1 indicates that the HPSU has room for one more request in its stack register. The MUA, in turn, will then send a request to the HPSU and an ACK 0 signal to the SP.

The MUA has the ability to service up to four HPSU's. Usual SP/MUA/HPSU configurations will have two to four HPSU's connected to a single SP through one MUA. When an SP requests a different HPSU, all outstanding requests to the first HPSU must be serviced first before the MUA can request a different HPSU. It is possible for requests to get out of order because of the priority determination in each HPSU.

All data and control signals from the SP are passed on to the HPSU and all data and control signals from the HPSU are passed on to the SP with the exception of a few special signals. The SP data words is four-36 bit words wide. Along with the data, an address dield of 22 bits and a function field of 6 bits is sent with the request. Odd parity is provided for every nine bits of data, making the SP data word 160 bits wide, the address dield 25 bits and the function code 7 bits.

F. Interface Signals

Generally it should be noted that all signals are unidirectional and the logical or active state is at the most positive voltage level. All control signals are 30 nanoseconds wide pulses.

1. SP Signals to MUA/HPSU

All of the interface latches illustrated in the figures are clocked on phase four. The signals shown in FIG. 5 are received by the MUA from the SP and are passed onto the HPSU.

(a) Request

This single line is a high going signal used to control the stack registers within the MUA.

(b) Request Tag

This single line signal from the SP is stored in the MUA. It is also passed along to the HPSU. The Request Tag and the Request Tag Response signals are used to isolate an SP request sequence error. The SP toggles this signal each time it generates a request.

(c) Address

The SP address format shown in FIGS. 6 and 7. It is 22 bits wide plus 3 odd parity bits for a total of 25 bits. Because each SP read data word is actually four words wide only 22 address bits are required to address up to 16 million words. Address bits 0, 1 as shown in FIG. 5 are the most significant bits and are used by the MUA to steer the request to one of four HPSU's.

(d) Function

The SP function format is shown in FIG. 8. It is six bits with one odd parity bit for a total of seven signal lines.

(e) Write Data

The write data format shown in FIG. 9 is four-36 bit words wide with an odd parity bit on every nine data bits for a total of 160 lines (144 signal plus 16 parity).

2. HPSU Signals to MUA/SP

The signals shown in FIG. 10 are received by the MUA from the HPSU and are passed on to the SP.

(a) Request Tag Response

The single request tag response line provides a response signal from the HPSU at ACK 1 time and is the same value as the request tag signal that was received by the HPSU.

(b) Acknowledge One

The ACK 1 signal is a single line and is used by the MUA to keep track of the number of requests outstanding to the HPSU. It is sent to the SP on the Acknowledge 0 line.

(c) Acknowledge Two

The ACK 2 signal line is passed onto the SP.

(d) Read Acknowledge Two Tag

This single line signal is passed onto the SP.

(e) Interface Check

This single line signal is passed to the SP.

(f) Internal Check

This single line signal is also passed to the SP.

(g) Read Data

The Read Data format shown in FIG. 11 is four-36 bit words wide with an odd parity bit on every nine data bits for a total of 160 lines (144 signal plus 16 parity bits).

(h) Bank Not Available

This signal indicates that a memory bank is not available. It is a single signal line that is sent from the HPSU instead of an ACK 1 and is used by the MUA to keep track of the number of requests outstanding to the HPSU.

(i) Initial Load Data 0,1

These two signal lines are passed to the SP.

(j) Multiple Uncorrected Error

These four signal lines are also passed to the SP.

3. SP/MUA Signals

In addition to the interface signals that are passed through the MUA, there are signals which are used exclusively for the MUA. These are shown in FIG. 12.

(a) SP Available

This pair of lines from the SP indicates that the SP is powered up and available. The over-all system is always partitioned such that the SP and the MUA are in the same application. That is, they are both working on the same task.

(b) MUA Available to the SP

This pair of signal lines from the MUA to the SP indicate that the MUA is provided up and the MUA available flipflop is set.

(c) Acknowledge Zero

This signal line informs the SP that the MUA stack register has room for one more request. When the SP request is sent to the HPSU a register in the stack is made available to receive another request. This signal is sent to the SP on the Acknowledge 1 line.

(d) Interface Check One

When the MUA detects a parity error on the data from the SP, the error is reported by this check signal. This is noted as the INTFC CHK 1 signal and is sent with the ACK 0 signal.

(e) Interface Check Two

When the MUA detects a parity error on the data from the HPSU, the error is reported to the SP by this check signal. It is referred to as the INTFC CHK 2 signal and is sent with the read data.

(f) Internal MUA Check

When the MUA detects a duplex error or if the wrong HPSU responds, the MUA will halt by not sending out any more requests to the HPSU. The Internal MUA Check is sent wherever an error is detected.

(g) External Sequence Check

When the Request Tag Response signal is received from the HPSU, a compare is made against the stored MUA Request Tag Signal. If a comparison is not made, then an External Sequence check signal is sent at ACK 1 time from the MUA.

(h) Storage Unit Not Available (SUNA)

If the SP requests an HPSU which is not in its application (i.e. the system has been partitioned such that this SP and this HPSU have not been partitioned to the same application) the MUA generates a SUNA signal at ACK 0 time.

(i) Master Clear

This synchronized signal from the SP will clear the request stack. The width of the signal is one four-phase clock cycle.

(j) MUA Present

This line indicates to the SP that a MUA is configured into the system. This line when a logical high will signal that a MUA is present.

4. MUA Local Interface Signals

Local signals are those line which are generated within the cabinet. These include power up clear, and clock phases.

(a) Power-Up Clear

The D.C. power control will issue a power-up clear to the MUA through a backpanel pin. The MUA will clear all registers to a known state.

(b) Clock

After a power-up clear, the MUA clock comes up with its rate cleared to normal, it mode cleared to normal and stopped. The MUA clock is started by the SSP. The clock card issues the level one phases to the various logic cards where they are fanned out by the Clock Gate Array. The clock card has four modes of operation; normal, cycle select, phase select and phase step.

5. Available Signals

The following signals are between the MUA and the HPSU's. They are shown in FIG. 13.

(a) MUA available to the HPSU

After the MUA is powered up, the MUA available flipflop is set by the System Support Processor (SSP). This pair of signals are then sent to all HPSU's.

(b) HPSU Available

This pair of lines from each HPSU indicates that the HPSU is available. The available flipflops are used in conjunction with the partitioning previously noted.

G. Building Blocks of the Multiple Unit Adapter.

1. STACK

Figure 14:
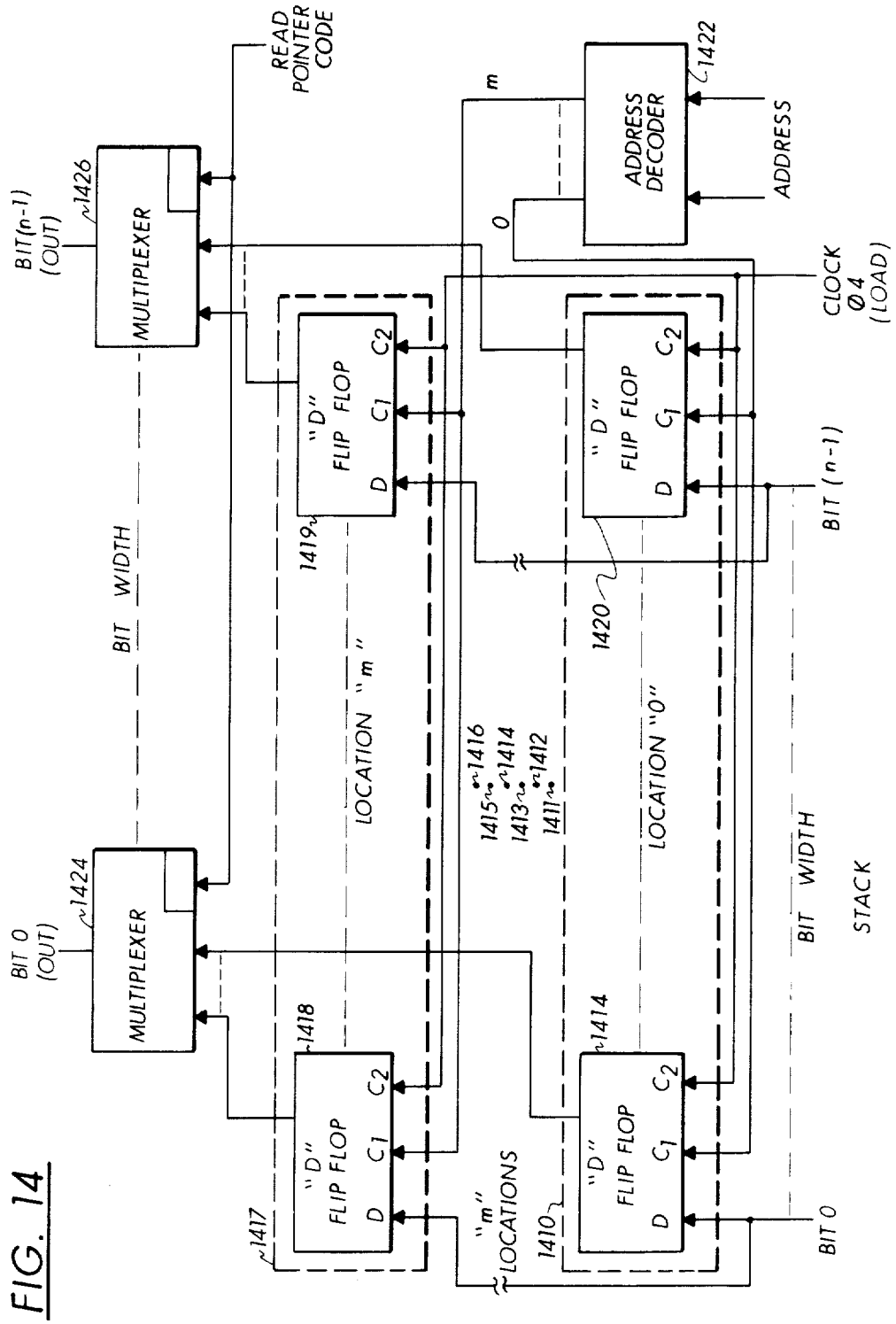
FIG. 14 is a detailed logic diagram of a storage stack of the first-in, first-out variety such as is used in the present invention.

FIG. 14 illustrates the logical block diagram of the stack used herein. Basically, it comprises a plurality of D flipflop circuits which circuits will not be further described because of their familiarity with those skilled in the art.

Consider, for the sake of explanation, the address stack which is representative of the stacks used in this invention. Remember, however, that the function and data stacks are similarly constructed of the same flipflop elements.

In the address stack, there are a total of eight locations. Each of the locations has a total of 25 bits. Thus, in the drawing of FIG. 17, bit $n-1$ will be the 24th bit and location m will be location 7.

As shown in the figure, there is a plurality of 8 locations 1410–1417, each of which includes a plurality of 25 flipflops 1418, 1419. Bit 0 simultaneously enters the first flipflop in each of the 8 locations. Similarly, bits 1 through bit 24 enter their corresponding flipflops. It may be more easily explained if it were considered that they are a plurality of flipflops arranged in a matrix of m rows by n columns. Bit 0 is applied to all of the flipflops in column 0. Although not shown, it is understood that the column 1 flipflops receive bit 1, column 2, bit 2 etc. until all of the flipflops of the matrix are full. Meanwhile, the address code is entering the addressed rows of the stack via decoder 1422. A phase four clock signal is simultaneously applied to all of the flipflops of the matrix. The simutaneous presence of this pair of signals at each of the flipflops as a result of the address signal and the phase 4 signal actuates the selectively addressed location. This produces an output from each of the flipflops of the location which output is sent to the plurality of multiplexers 1424, 1426. There are as many multiplexers as there are bits in the width of each location. In the address stack this results in a total of 22 bits plus 3 parity bits. In the data stack, of course, the width is 160 bits, while in the function stack the width is 7 bits.

2. LATCH

Figure 15:
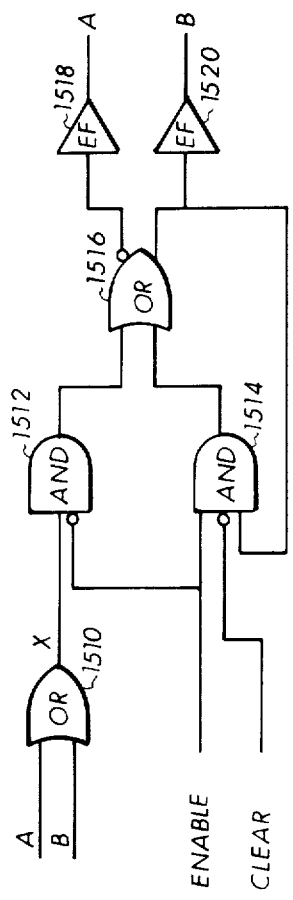
FIG. 15 is a detailed logic diagram of a standard latch used as a building block in the present invention.

The basic latch used in all of the logic drawings of this invention is illustrated in FIG. 15. It is, of course, understood that the latch shown is merely illustrative and that any similar latch performing the same function may be substituted. A pair of input signals shown here as A and B are sent through OR gate 1510 to provide an X output signal. The X output signal is applied to the two input AND gate 1512. An enable signal and a clear signal are also applied as input signals to the latch. A three input AND gate 1514 receives both the enable and clear input signals and the enable signal is also sent to the 2 input AND gate 1512. The two AND gates 1512 and 1514 are directly coupled to the input of OR gate 1516 to provide A and B output signals via emitter followers 1518 and 1520. A feedback coupling is returned from the output of OR gate 1516 to the input of AND gate 1514 to provide the required latching feature. A truth table, positioned adjacent to the latch circuit, illustrates the various output levels for the indicated input levels. For example, a high (most) positive) signal level applied at terminal X to the AND gate 1512 produces a high output signal level or terminal B of the emitter follower 1520 provided both the clear and enable input signals are at a low level.

3. SELECTOR/LATCH

Figure 16:
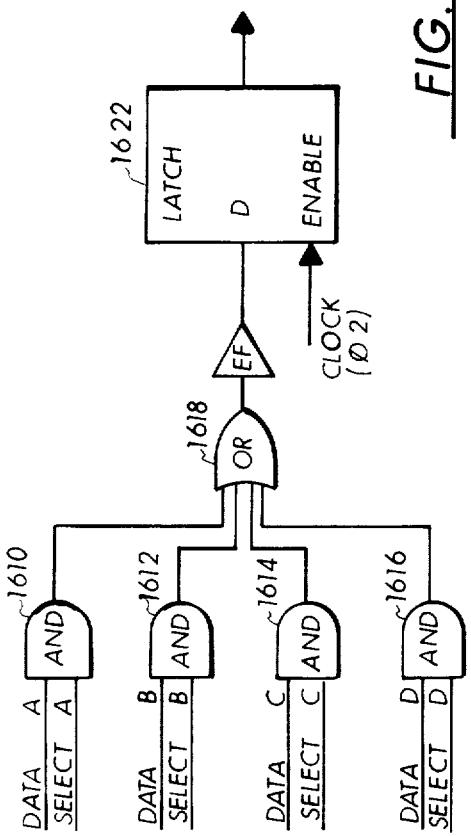
FIG. 16 is also a detailed logic diagram of a selector latch such as is used as a building block in the present invention.

A selector latch is shown in FIG. 16. This is the circuit that is used in the present invention to determine which HPSU has been selected to provide the requested information.

As shown in the figure, the circuit is divided into a front end selection portion and latch portion. The selection portion includes a plurality of AND gates 1610, 1612, 1614 and 1616. Each of these AND gates receives an HPSU input. Thus, HPSU 0 enters AND gate 1610, HPSU 1 enters AND gate 1612 and so on. Into each AND gate 1610, 1612, 1614 and 1616 a selection control signal is also applied. In this manner, the proper HPSU output is sent to OR gate 1618. Any input to OR gate 1618 is passed through emitter follower 1620 to drive latch circuit 1622. This is a similar circuit to the latch previously described and will not be discussed further.

Again a corresponding truth table is located adjacent to the select n latch in FIG. 16 to indicate the appropriate outputs for corresponding inputs to this selctor/latch circuit.

4. HPSU Loading Circuit

Figure 17:
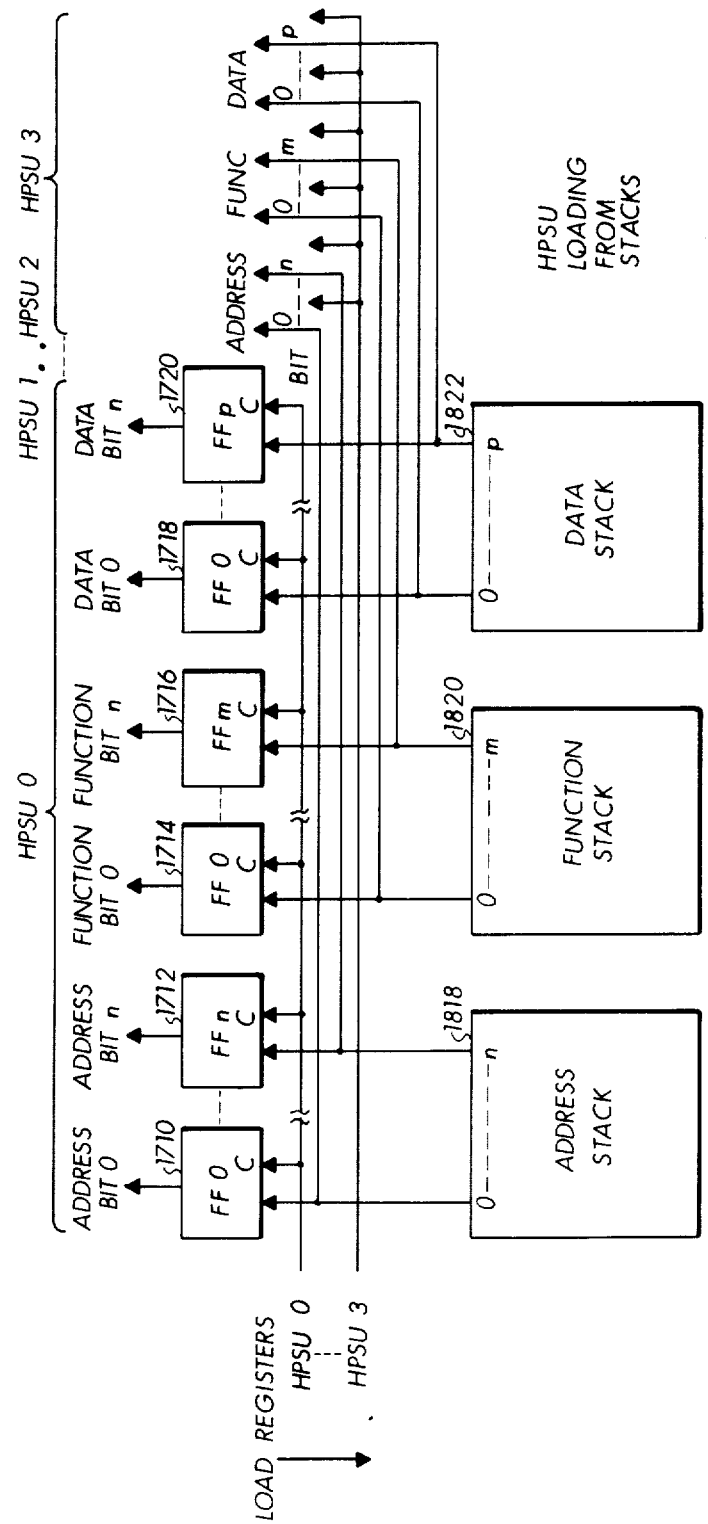
FIG. 17 is a detailed logical presentation showing the portion of the system that is used for loading the HPSU's from the stacks of FIG. 16.

The circuit in FIG. 17 is a detailed logic diagram of the portion of the MUA which accomplishes the loading of the HPSU from the stacks of the MUA. Although only the loading of the HPSU 0 will be described here, it should be understood that the description may be repeated for HPSU 1, HPSU 2 and HPSU 3.

The full number of bits 0-n from the width of the address stack 1818 are sent to an equal number of flip-flops FF0, 1710 through FFn, 1712.

Similarly, the bits 0-m from the function stack 1820 are sent to an equal number of function stack flipflops FF0, 714 through FFm, 1716.

Finally, the bits 0-p of the data stack 1822 are sent to an equal number of data stack flipflops FF0, 1718 through FFp, 1720. As stated previously similar lines come from each of the stacks; address, function and data to corresponding flipflops. Further, this concept is again repeated for HPSU 1, HPSU 2 and HPSU 3.

A clock signal is applied to each of these flipflop circuits from each of four load register locations. Thus, HPSU 0 load register signal actuates the flipflops corresponding to that HPSU unit to effectively enable the transfer of information from the stacks to the selected HPSU.

H. Detailed Logic Diagrams

FIG. 18 is an overall detailed logic diagram of the write portion of the MUA. Interface from the SP to the write portion of the MUA is accomplished via cables 124, 126. This interface consists of 25 address bits, 7 function bits, 160 write data bits a single request bit and a single request tag bit. An eight deep data stack 1870 includes an address stack 1818, a function stack 1820 and a write data stack 1822. It is this data stack 1870 which receives the 25 address, the 7 functions and the 160 write data bits. On each request 124 entering latch 1810 from the SP, the data is loaded into the data stack 1870 via cable 126. Simultaneously with this data load, the load pointer 1814 is advanced. This sequence is repeated until a total of eight requests have been received. Correspondingly, the data and function stacks have each received the data and functions associated with each of these eight requests and are completely filled. Since the stack 1870 is a first-in, first-out memory, the data will flow out the top of the stack 1870. Thus, from the top of the address stack 1818 will emerge a 22 bit memory address plus 3 parity bits. Likewise a six bit function code plus a parity bit comes from the function stack 1820 while 144 bits of data and 16 parity bits are transferred out of the write data stack 1822. The actual output comes from that location of the stack 1870 determined by the read pointer (0 PTR) 1816. This read pointer 1816 is advanced each time a request is sent to an HPSU.

The MUA examines the HPSU address requested by the SP. Meanwhile it continues to make these HPSU requests every 30 nanoseconds until a total of eight requests have been sent to the HPSU's without an acknowledge signal being received. Also this string of eight requests will only continue so long as the HPSU being requested remains the same. If a different HPSU address is decoded by address decoder 1824, this will also halt the string.

The HPSU response control examines the ACK 1 lines, the Bank Not Available lines, and the Request Tag Response lines from the four HPSU's (0, 1, 2 and 3). An active signal on any of the ACK 1 or BNA lines decrements the counter 1808, which counter has been incremented by each request signal sent to an HPSU. When the counter contents equals zero, this indicates that there are not any outstanding HPSU requests. This means that the MUA can now request a different HPSU. Also if an ACK 1 or a BNA signal is received from an HPSU other than the one requested, an Internal Stop Error will occur. Further, if the Request Tag Response signal received does not correspond to the Request Tag sent to the HPSU's, an External Sequence Error is generated. Naturally, the occurrence or generation of any error will halt the sequence.

The operation of the MUA portion shown in FIG. 18 starts with a signal clearing the unit. The Input (I) or Load Pointer and the Output (O) or Read Pointers are both aligned at the first position of the stack. This is done so that the first request is loaded into the first position. Following that, the first action that takes place is a request from the SP via 124. Address, Data and Function information are sent with each request on lines 126. Once the request 124 and SP data 126 are loaded, the load POINTER 1814 is advanced to the next location so that the next request and data is loaded into the next location. This sequence continues until eight requests and associated data have been loaded into the eight locations. This is the maximum number of requests that the SP will send without receiving an acknowledge signal from the MUA. That is, once eight SP requests are sent, no further request signals will be initiated by the SP until the MUA sends back an indication that it has sent a request to an HPSU. Now once a request has been loaded into a stack, the MUA will read out of that location in the stack as indicated by the Read or Output (O) Pointer 1816. The reading out of that information causes it to be transferred to the correctly selected output latches for transmittal to the proper HPSU. That is, the information that has been read out of the stack at the location of the output pointer will be sent to the addressed HPSU by having the correct latches place the proper signals on the output lines 134. The address information bits determining which one of the four HPSU's is selected is accomplished by a decoding operation performed by Address Decoder 1824. Basically, the decoding operation is performed upon the first two most significant bits of the selected address. Address Bits 0 and 1 are used to encode the four possible combinations of the HPSU selection via lines 128.

Figure 19:
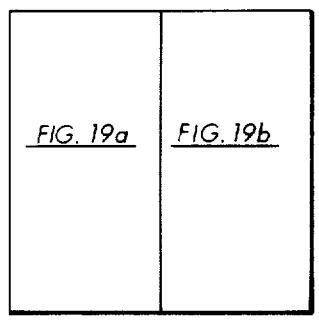
FIG. 19 includes FIGS. 19a and 19b which taken together show a detailed logical diagram of the portion of the MUA that is shown in general in FIG. 18 as the Request Counter and the Decoder.
Figure 19A:
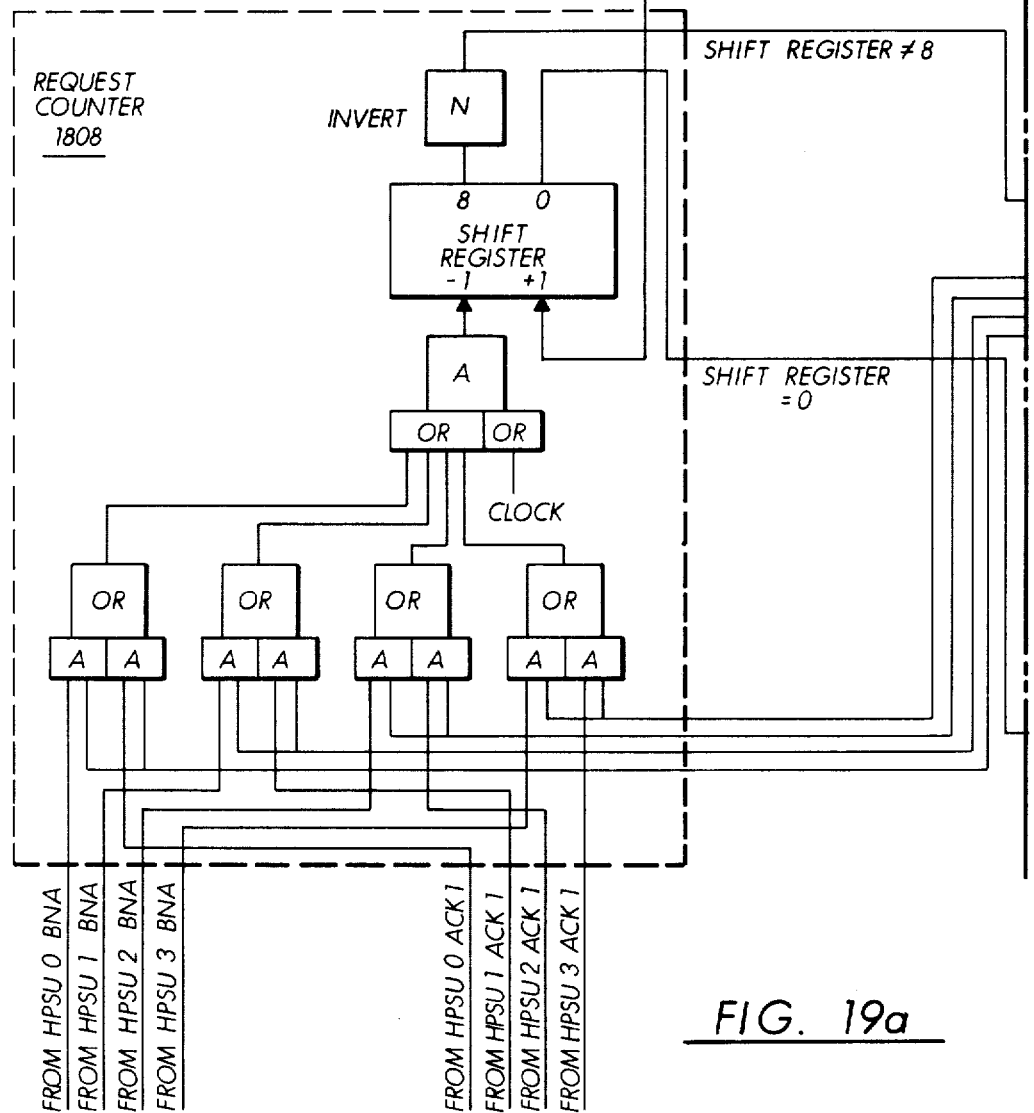
Figure 19B:
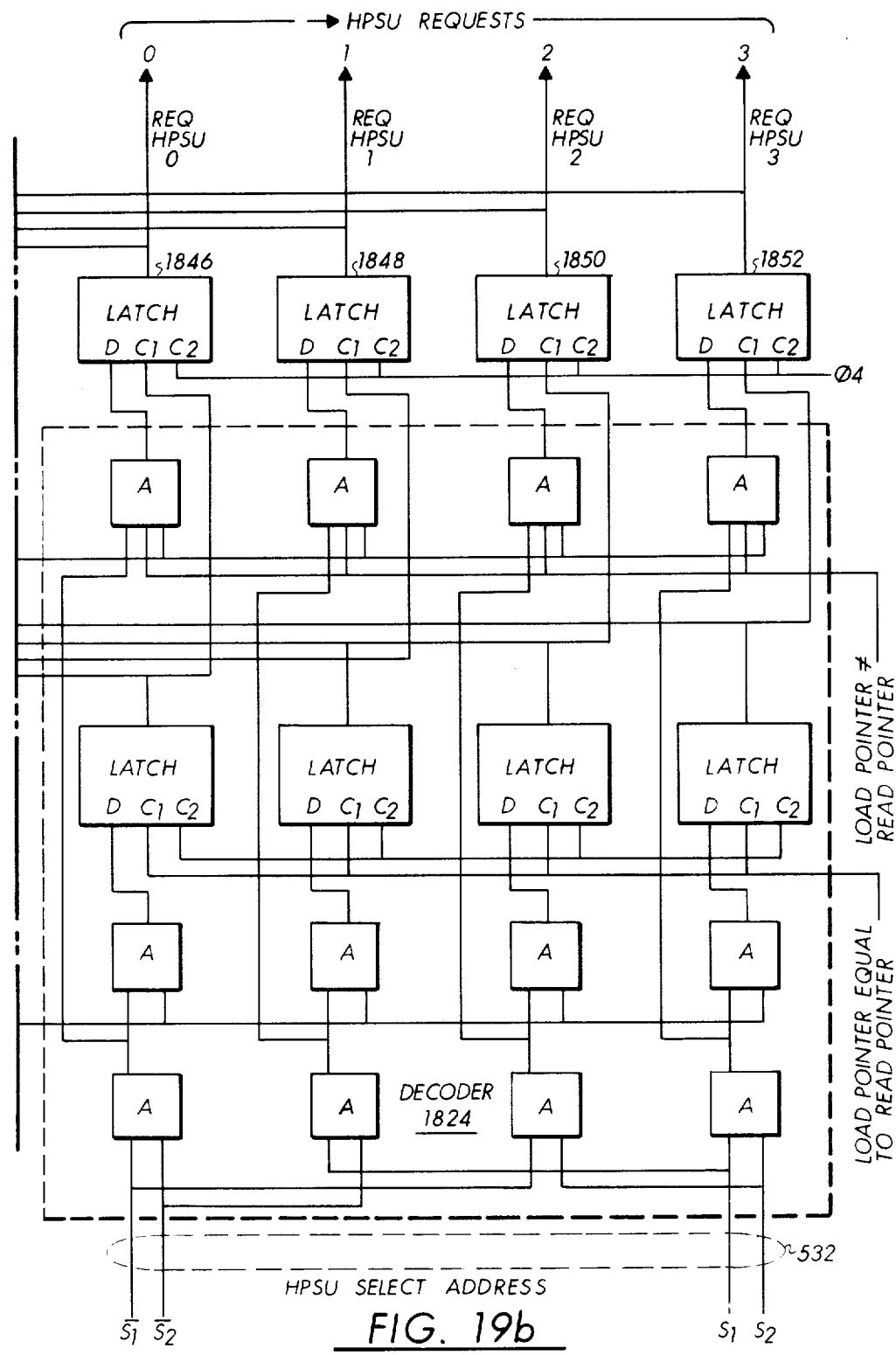

Initially, when the Input and Output Pointers are equal, the loading of the latch control shown in detail in FIG. 19, which includes FIGS. 19a and 19b, is accomplished. It is this operation which will indicate which HPSU is requested. Once that control data is loaded, the information is then clocked out to the appropriate HPSU.

Every time that a request signal is sent out to an HPSU, the read pointer 1816 is advanced and request count 1808 is advanced.

This shown in FIG. 18, OR gate 1864 from the latches 1846, 1848, 1850, and 1852 feeds back a signal via AND gate 1868 to advance the read (O) counter or pointer 1816 and advance request counter 1808. Basically request counter 1808 is a shift register which keeps track of the number of requests sent to the HPSU's via output control lines 128. In addition, at the same time, an acknowledge 0 signal is returned to the SP. This tells the SP that one position of the stack has been read out and the MUA is now in a position to receive another request from the SP. This operation is repeated until the Request Counter 1808 has a count of 8, in which case no more requests are sent out. This is because the HPSU itself has a stack arrangement somewhat similar to the MUA. Thus, eight requests may be sent out before an acknowledgement signal is returned to the MUA from the selected HPSU. In the event that eight requests have already been transmitted, the initiation of any further requests is blocked.

If the Read Pointer 1816 and Load Pointer 1814 realign before 8 requests have been sent to an HPSU, no more requests are sent since this condition indicates that all SP requests that were received by the MUA have been sent to an HPSU.

In the event that the select bit information changes from one HPSU to another, whatever information that was scheduled to be sent is blocked until the shift register drops back to zero to indicate that there are no longer any outstanding requests. In which case, it is now possible to shift to another HPSU. Otherwise, there would be a possibility of getting requests out of sequence when the information was returned from the HPSU's.

Returning to the request counter 1808, it should be remembered that this register is incremented each time a request is sent and decremented each time an acknowledge or a bank not available signal is received from the HPSU indicating that the HPSU is utilizing or has utilized that particular request.

Referring again to FIG. 18, once it is determined which HPSU that the information is being requested, that same selection determination is used to determine which of the four output latches 1856, 1858, 1860 and 1862 that is to be loaded with data for transfer to the selected HPSU over the output lines 134.

Request counter 1808 is shown in detail in FIG. 19 to reveal that it includes a shift register 1940 and a plurality of AND/OR gates 1910, 1912, 1926; 1914, 1916, 1928; 1918, 1920, 1930; and 1922, 1924, 1932 feeding a counter OR gate 1934 which together with a clock signal OR gate 1936 activates an AND gate 1938 to decrement the shift register 1940.

Similarly, the Decoder 1824 is also shown in detail in FIG. 19. The HPSU select address is presented as an S1 and an S2 signal. In each case both the S signal and its complement $\bar{S}$ is presented. Thus, S1 and S2 signals are applied directly to AND gate 1948, which only S1 is applied to AND gate 1944, and S2 to AND gate 1946. In this manner, various combinations of S1, S2, $\bar{S}1$ and $\bar{S}2$ are used to selectively activate one of the plurality of AND gates 1942, 1944, 1946, and 1948. An output signal from any one of these AND gates is selectively sent to another bank of AND gates 1950, 1952, 1954, and 1956. Upon the occurrence of a signal from the shift register 1940 to the selected one of these AND gates, which signal indicates that the shift register equals zero, an output signal from the selected AND gate is sent to a correspondingly plurality of latches 1956, 1960, 1962 and 1964.

On the next phase four (Ø4) signal, the selected one of output latches 1846, 1848, 1850 and 1852 is activated and the request is sent to the addressed HPSU, i.e. HPSU 0, 1, 2 or 3 via one of the output lines 128.

It should be remembered that a request is sent to the selected HPSU only if the shift register 1940 is not equal to 8 and the Load Pointer 1814 and Read Pointer 1816 are not equal.

Figure 20A:
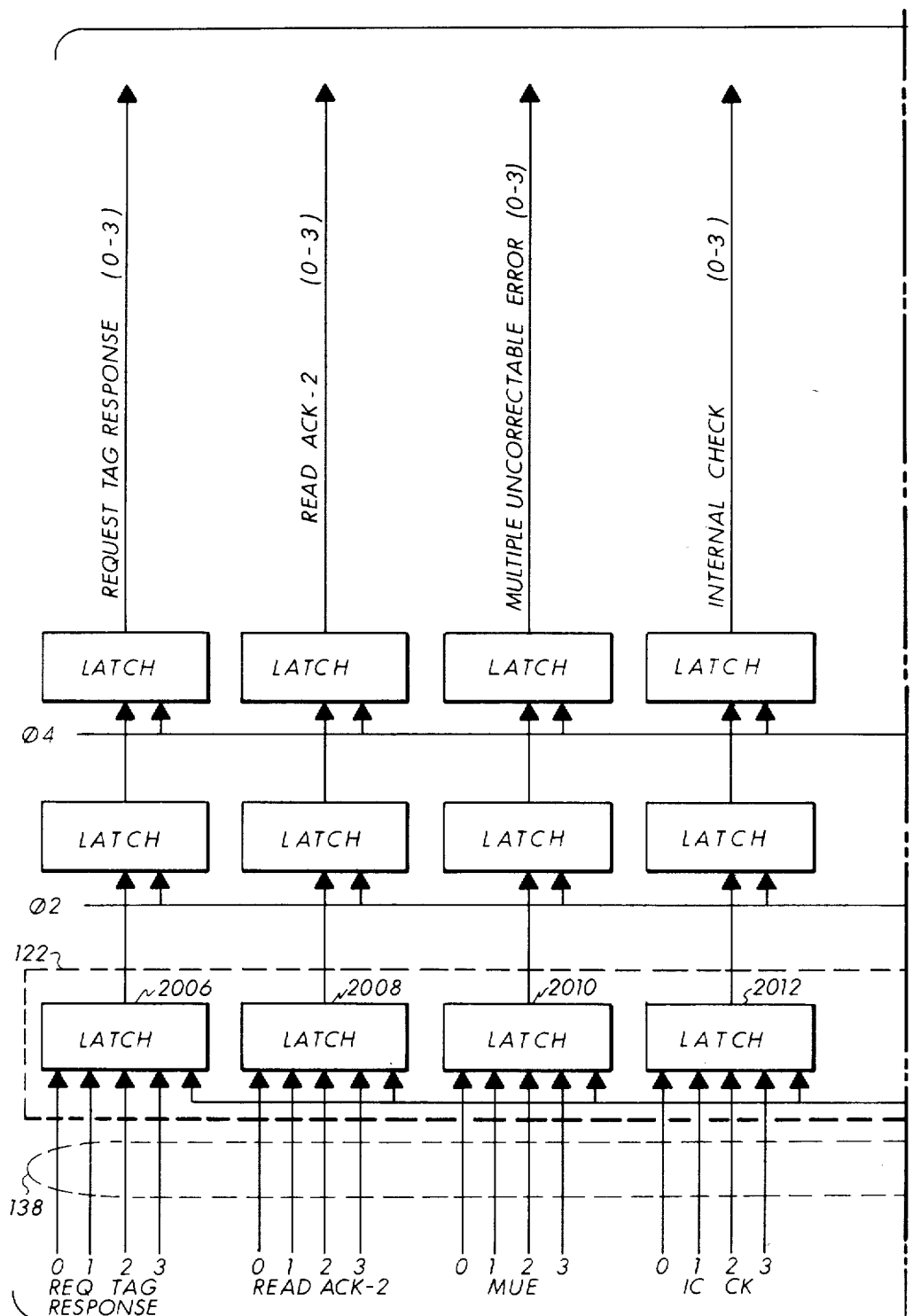
FIGS. 20a, 20b, and 20 c taken together provide an over-all logical diagram of the MUA showing that portion of the MUA which is operative during a reverse operation of that illustrated in FIG. 18 in that the information selected in the HPSU is now returned via the logic of this figure to the SP which originally requested it.
Figure 20B:
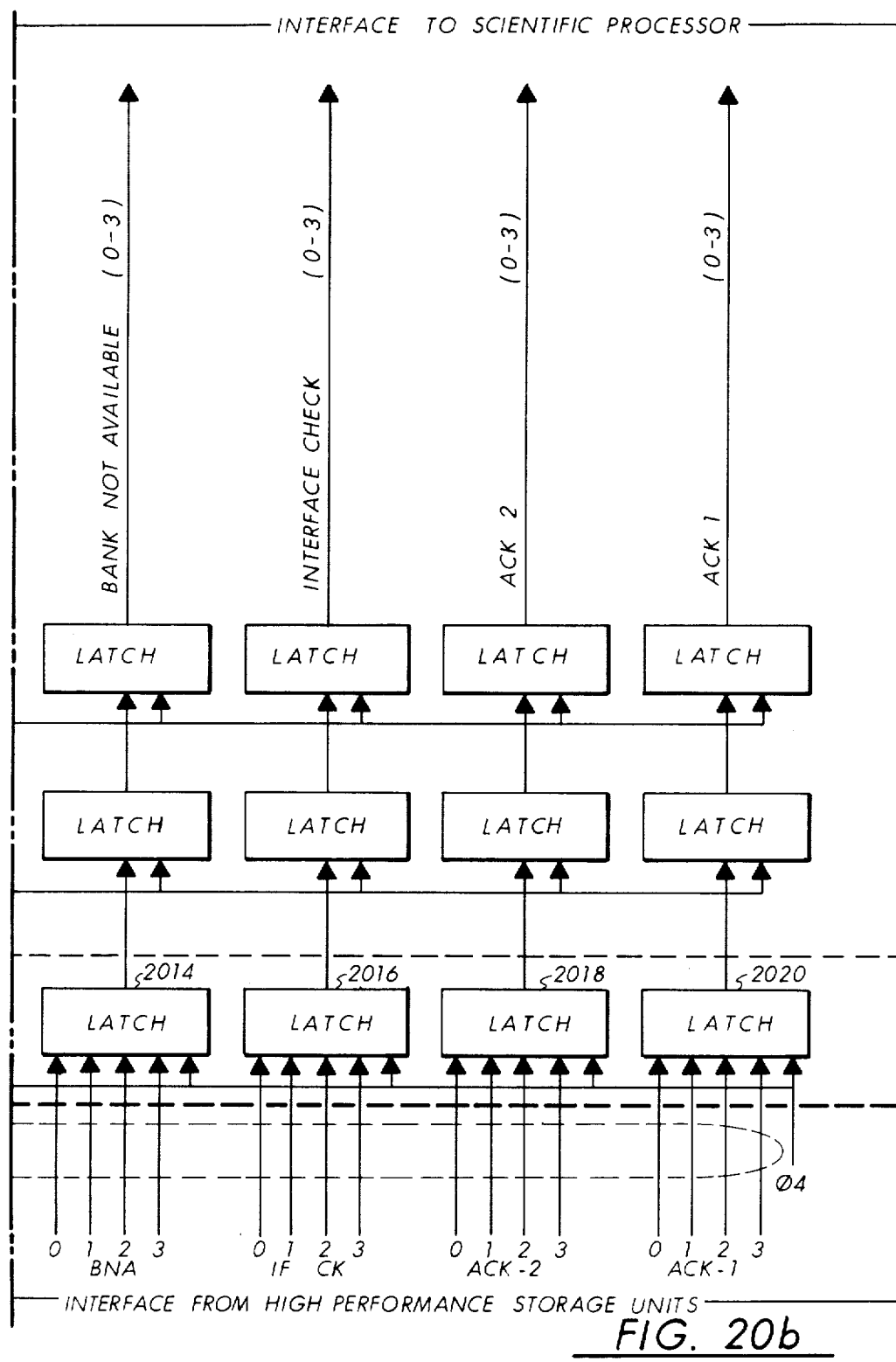
Figure 20C:
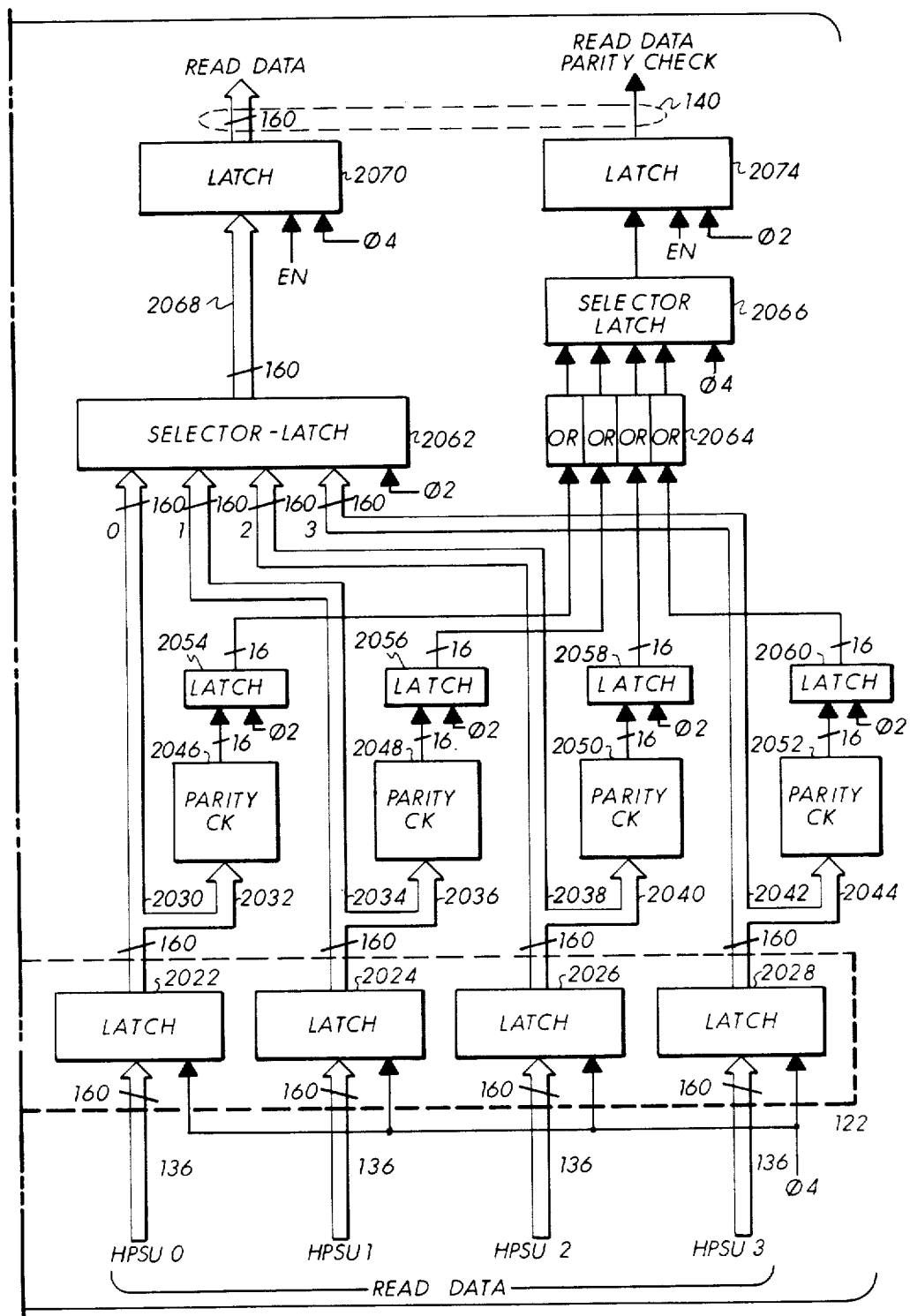

FIGS. 20a, 20b and 20c taken together illustrates an over-all logic diagram of that portion of the MUA which is utilized in the return path, i.e. from the selected HPSU to the SP via the MUA.

A plurality of input latches 122 receives the signals coming from the HPSU interface. These signals comprise the control portion 138 and the data portion. The data portion includes four identical input cables 136 each of which comprises 160 bits.

All of the control signals 138 are passed through via successive banks of latches. These banks are successively clocked in phase steps to move the control signals through the MUA and to the SP interface. Thus, at Ø4 these signals enter latches 2006, 2008, 2010, 2012, 2014, 2016, 2018 and 2020. At the following Ø2, they enter the next higher bank of latches and on the following Ø4, they pass onto the interface output lines for return to the SP. When an ACK 2 signal is received from the HPSU, it is known that data will be arriving on the next cycle.

This data, depending upon which HPSU it was received from, enters one of the data latches 2022, 2024, 2026 or 2028. This data is entered into the selected latch upon receipt of the Ø4 clock signal.

Following these latches is a selector latch, illustrated in detail previously in FIG. 16. This selector 2062 is controlled by the original information shown in FIG. 19 which controlled the HPSU Request. The information enters latch 2062 upon the occurrence of the Ø2 clock signal and is passed via lines 2068 to LATCH 2070 where the HPSU read data is loaded on Ø4. The read data output lines 140 from latch 2070 are sent to the SP.

The MUA also determines if an External Sequence Error has occurred between the MUA and an HSPU. This is done by comparing the Request TAG sent by the SP and the Request TAG Response sent by the HPSU.

The Request TAG is received from the SP via line 124 and latched in 1806 on ∅4. This latched signal is stored in a Request TAG stack (not shown) in addition to being sent to the requested HPSU. This loading of the Request TAG stack occurs at the location as determined by Load Pointer 1814. Initially, a Request TAG READ Pointer (not shown) is aligned with Load Pointer 1814. Upon receipt of a Request TAG Response from an HPSU, said signal is loaded into Latch 2006 (FIG. 19) and the output of Latch 2006 is coupled to an XOR (not shown) where it is compared to the Request TAG stored in previously noted Request TAG STACK. If a compare does not occur, an External Sequence Error is sent to the SP.

Parity is checked on all data received by the MUA from the SP and on all data received by the MUA from the HPSU's. The MUA informs the SP whenever a parity error is detected.

Figure 21:
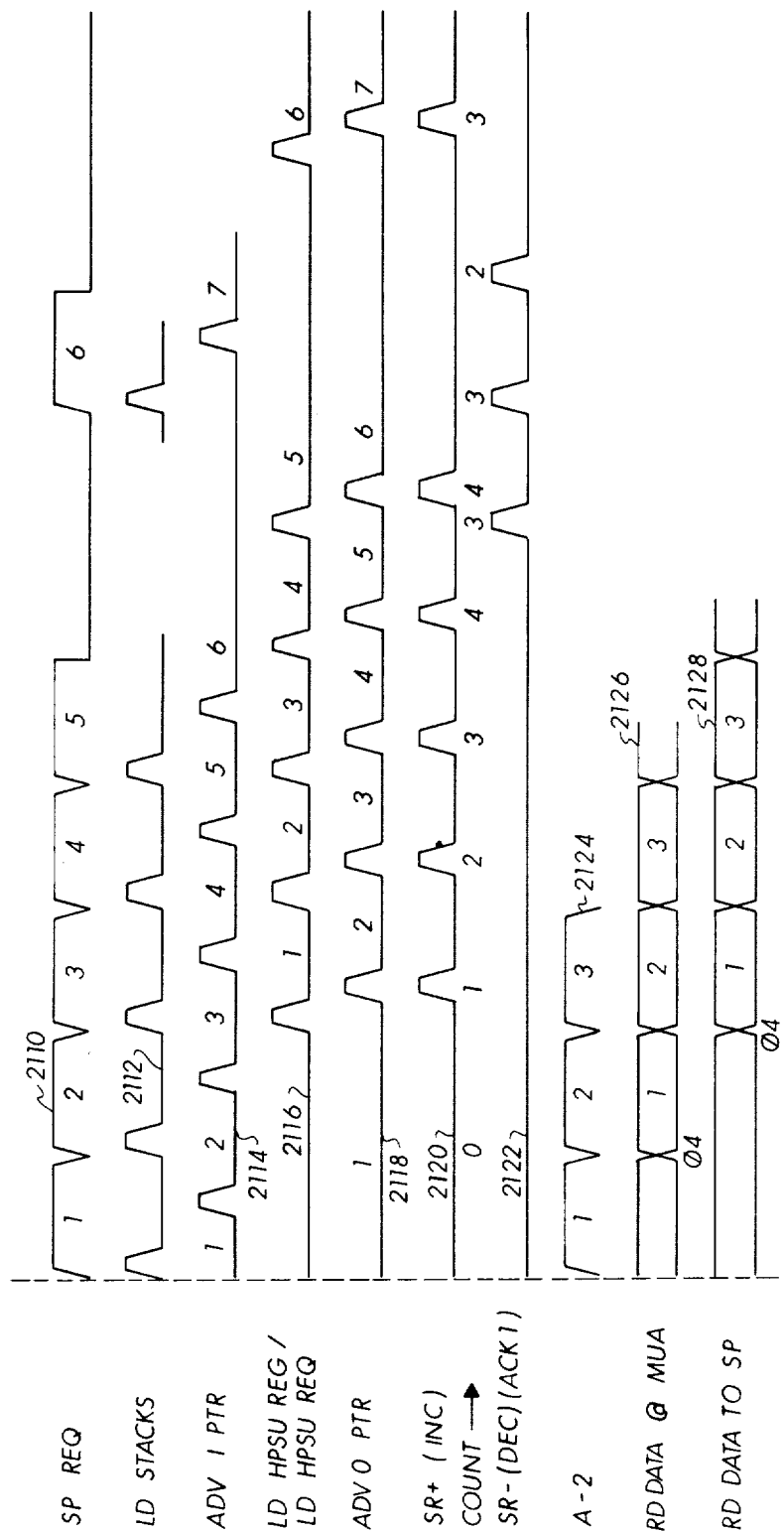
FIG. 21 is the timing diagram of the MUA.

FIG. 21 is the timing diagram of the MUA. To begin, it is basically considered that ∅4 is the reference line. The first action that takes place is the receipt of a request from the SP. This could be as many as eight successive requests. Thus, the top timing signal 2110 is a series of five of the eight possible requests. There is a gap of two clock cycles when no requests are received, followed by the sixth request. Each request is sent accompanied by a request tag so this same line also corresponds to a request tag representation.

The next operation is shown at line 2112. This is the load stack operation, wherein each successive location of the stack is loaded followed by an advance of the load pointer following each pulse of the load stack line 2112. So, if there is a request 2110, then the stack is loaded 2112, followed by an advance signal to the counter 2114. This sequence continues as long as there are requests being received. When the requests stop, as shown after request pulse 5 of line 2110, the load stack pulse 2112 and the advance I pointer 2114 also cease. What is shown is the actual location of the pointer 2114, so when the pointer is in one it is advanced to two and then to three and so on. Finally, when the pointer is now pointing at seven, the loading has been completed on six and since there is not a seventh request, the pointer will just wait until a new request is received.

Figure 18A:
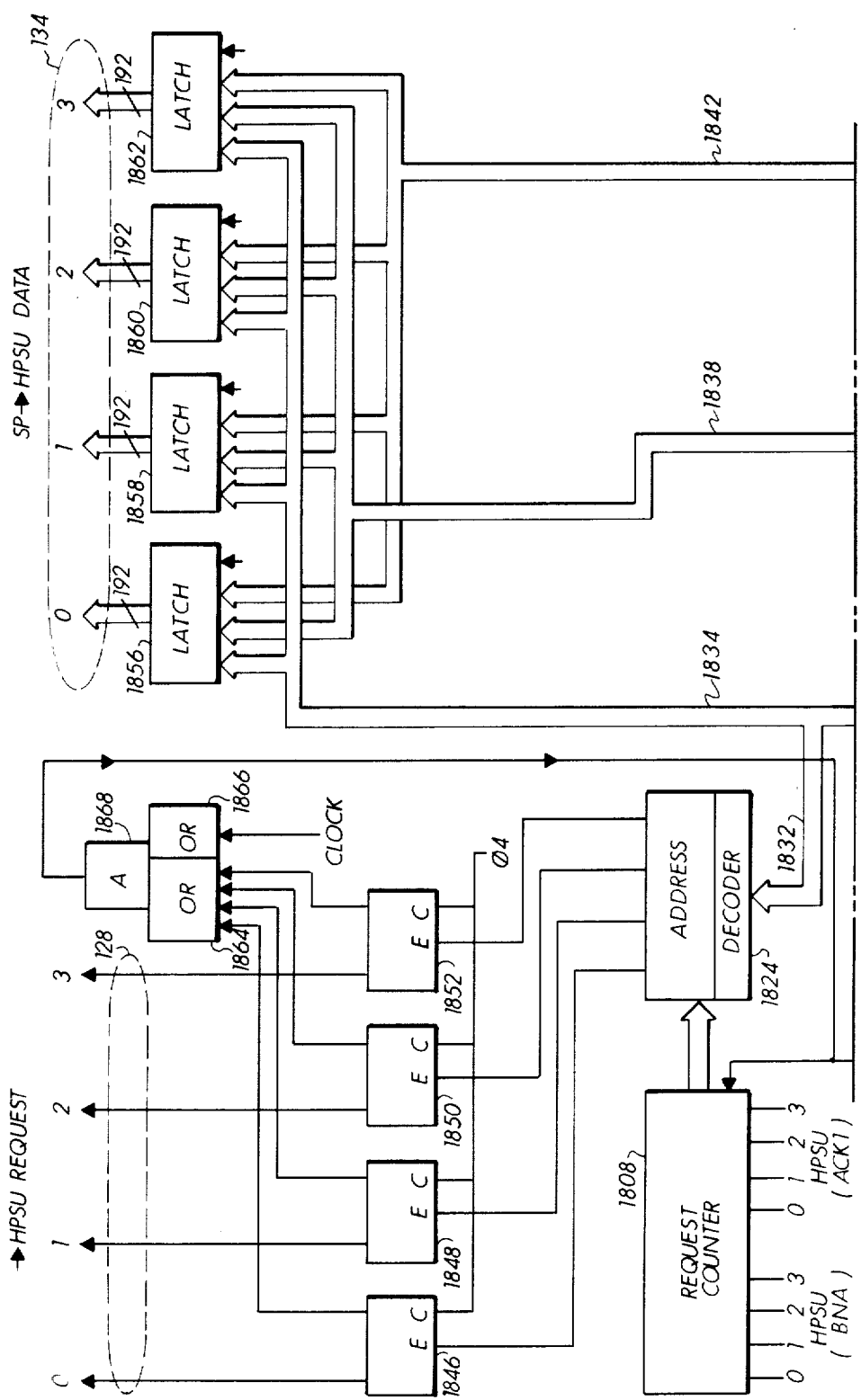
FIGS. 18a and 18b taken together illustrate an over-all logical diagram of the MUA showing that portion of the MUA which is operative during a transfer of information from the SP to a selected one of the HPSU's.
Figure 18B:
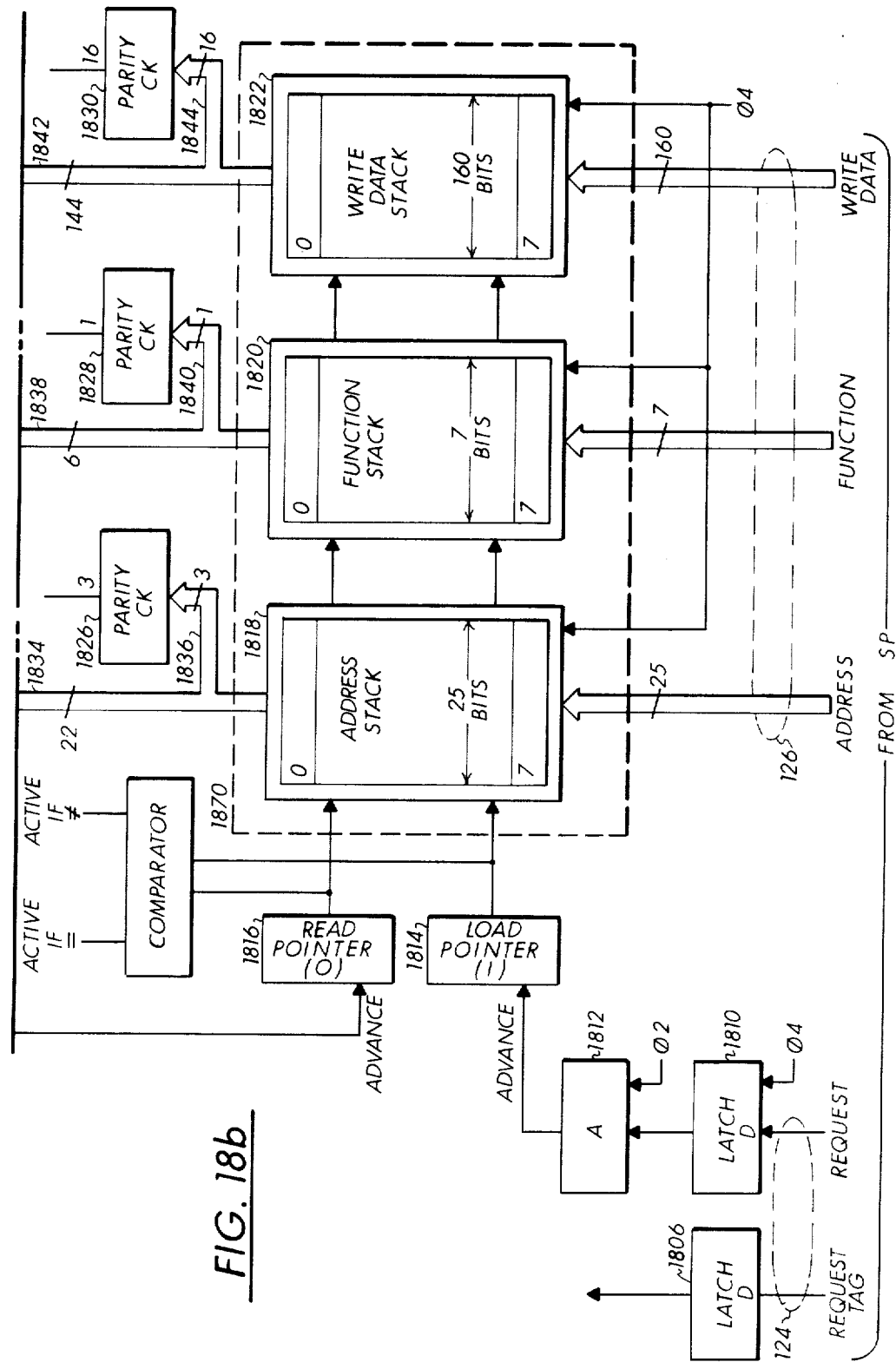

Now after the operation of the decoder 1824 of FIGS. 18a and 18b are passed through, which decoder is shown in detail in FIGS. 19a and 19b, the next operation is to load the HPSU request. This request is associated with the first request that came in with the data. This is the data that is going to the HPSU. So long as the same HPSU is addressed, the loading of the requests continues. If a different HPSU is addressed, the operation halts.

The output pointer which determines which information is being taken off the stack actually starts at position one. After the request is loaded, which also means that the output registers feeding the HPSU are loaded, the output pointer 2118 is advanced. This is done each time a request is loaded. The end result is that when this is all finished, the output pointer points to position 7 which still has not been loaded because the request stopped at six.

The shift register is shown on two lines, 2120, and 2122. The shift register starts out at zero and each time a request is sent to the HPSU, the shift register (SR) is incremented. This is shown on line 2120 where a series of pulses 1 through 6 are illustrated. The lower line 2122 is a series of decrement pulses. Each pulse on this line reduces the register by 1. Thus, the SR was at position 4 and is decremented back to 3, so that the next incrementing pulse on line 2120 brings the register back up to 4. Also because they are equivalent signals, the shift register is decremented each time it receives an ACK-1 signal or a BNA signal.

FIG. 21 illustrates on line 2122 that ACK-1 signals are received from the HPSU's. Returning to the discussion, after the SR is incremented to 4 it is decremented first to 3 then to 2. Now at this point another incrementing pulse is received returning the shift register to 3.

Six cycles from the time an ACK-1 is received, plus one cycle for the cable delay, the read data is received at the MUA.

Just prior to that one cycle, an ACK-2 signal is seen for the first time associated with the first request that was sent.

Timing diagrams 2124, 2126 and 2128 shows the read data and the ACK-2 signals returning from the HPSU. In diagram 2124, three ACK-2 signals are shown. At the same time as ACK-2, read ACK-2 signals are received, however, they are not used by the MUA. This simply tells the SP that there was a read cycle performed.

Next, the associated read data is received by the MUA. One cycle after the data is received by the MUA the read data is sent to the SP. The Read Data at the MUA 2126 and the Read Data sent to the SP, 2128 are both shown as double levels. They are really only a single signal, just being shown as either at a high or a low level.

On diagram 2126 phase 4 is shown occuring after the first pulse, at the crossover point. Halfway through the pulse ∅2 is shown activating the selector latch 2062 of FIGS. 20a, 20b and 20c. Finally, ∅4 is shown as occuring at the crossover point of the read data 2128 to the SP.

From the embodiments described, other multiple unit adapters with varying configurations would be apparent to these skilled in the art.

In view of the foregoing, it can be seen that the various stated objectives and purposes of the invention have been achieved. It is, of course, understood that various changes in logical circuit arrangements, circuit selection, and functionality will become apparent to those skilled in the art after having considered the teaching of the applicant without departing from the spirit and scope of the invention. Accordingly, what is intended to be protected by Letters Patent is set forth in the claims.

I claim:

1. In a multiprocessing digital data processing system having a plurality of high performance storage units, a plurality of instruction processors, each of said instruction processors being individually coupled to each of said high performance storage units, a plurality of input-/output processors, each of said input/output processors being individually coupled to each of said high performance storage units and a scientific processor with a repetitive cycling clock means and having a single high performance storage unit port, a multiple unit adapter for coupling the scientific processor to the plurality of high performance storage units, said multiple unit adapter comprising:

a single bidirectional scientific process port for coupling said multiple unit adapter to said single high performance storage unit port of the scientific processor;

a plurality of bidirectional high performance storage unit ports for individually coupling said multiple unit adapter to the plurality of high performance storage units;

a first direction communication means coupled between the single bidirectional scientific processor port and the plurality of bidirectional high performance storage unit ports, said first direction communication means further including a first-in, first-out memory stack means having a plurality of n+1 memory locations for sequentially receiving as many as n successive high performance storage unit requests from said scientific processor during n clock cycles of the repetitive cycling clock means of the scientific processor without receiving an acknowledgement signal from said single bidirectional scientific processor port and further for sequentially receiving a continuous successive string of high performance storage unit requests from said scientific processor during successive clock cycles of the repetitive cycling clock means of the scientific processor so long as an acknowledgement signal is received at least once every n cycles and the high performance storage unit requests are to the same storage unit, to provide a first path for writing information emanating from the single storage unit port of the scientific processor into selected individual high performance storage units of said plurality; and a second direction communication means coupled between the plurality of high performance storage unit ports and the single storage unit port of the scientific processor to provide a second path for returning information read from selected individual high performance storage units of said plurality to the scientific processor via said single storage unit port to thereby provide a digital data processing system capable of storage expansion while maintaining a scientific processor design having a single storage unit port.

2. The invention as set forth in claim 1 wherein said first-in, first-out memory stack means comprises a first portion of n+1 locations for storing address information, a second portion of n+1 locations for storing function information, and a third portion of n+1 locations for storing the data to be written, wherein n=the maximum number of memory requests that may be received by the multiple unit adapter without an acknowledgement by said multiple unit adapter of the receipt of such requests being made to said scientific processor.

3. The invention as set forth in claim 2 wherein the first, second and third portions of said memory stack each have an equal number of locations and correspondence between identical locations of all of the portions, such that the address information stored in a particular location of the first portion pertains to the function information stored in a corresponding location of the second portion and also to the data information stored in a corresponding location of the third portion.

4. The invention as set forth in claim 3 wherein an address decoding means is coupled to the first portion of said memory stack means whereby the addresses stored in that portion may be decoded to provide destination directions for storing the function information and the write data information contained in corresponding locations of the second and third portions of the memory stack.

5. The invention as set forth in claim 4 wherein a stack pointer means is coupled to the memory stack means to keep track of the information written into and read from said memory stack means.

6. The invention as set forth in claim 5 wherein said stack pointer means includes a load stack (I) pointer portion for indicating the stack location which has just received information and a read stack pointer (O) portion for indicating the stack location which has just transmitted information.

7. The invention as set forth in claim 6 wherein input advancing means are associated with the load stack pointer (I) portion of the stack pointer means to increment it each time an access request is received and output advancing means are associated with the read stack pointer (O) portion of the stack pointer means to decrement it each time an access request is satisfied.

8. The invention as set forth in claim 4 wherein a high performance storage unit request counter means is associated with the decoder means to count the memory access requests to said high performance storage units received by and the memory access requests satisfied by said multiple unit adapter means.

* * * * *